Oct. 12, 1965  T. H. BATZER  3,211,478
ALUMINUM FOIL ULTRA-HIGH VACUUM GASKET SEAL
Filed Nov. 9, 1962

INVENTOR.
THOMAS H. BATZER
BY
*Roland A. Anderson*
ATTORNEY

United States Patent Office 3,211,478
Patented Oct. 12, 1965

3,211,478
ALUMINUM FOIL ULTRA-HIGH VACUUM
GASKET SEAL
Thomas H. Batzer, Livermore, Calif., assignor to the United States of America as represented by the United States Atomic Energy Commission
Filed Nov. 9, 1962, Ser. No. 236,750
4 Claims. (Cl. 285—328)

The present invention relates generally to gasket seals and, in particular, to a simple and inexpensive ultra-high vacuum gasket seal, wherein the gasket material utilized is a common variety of household aluminum foil.

There are many gasket seals and sealing means available for use in high-vacuum work in research and in industry. For example, various pinch gaskets and gold corner seals are available, and are reliable for such use in bakeable ultra-high vacuum systems. However, most useful and practical gasket seals utilized at the present time are costly, asymmetrical, and cumbersome in design, and utilize special gasket materials or intricate configurations for achieving a positive seal capable of bakeout in ultra-high vacuums of, for example, $10^{-9}$ Torr. ($10^{-9}$ mm. of mercury).

The present invention overcomes the foregoing disadvantages of conventional gasket seals by utilizing mating flanges of similar configuration, such flanges effecting a reliable seal by utilizing the combination of a particular seal surface design and a gasket of aluminum foil.

Therefore, it is an object of the present invention to provide a simple, inexpensive, and demountable gasket seal which can withstand high bakeout temperatures while functioning properly as an ultra-high vacuum seal.

It is another object of the present invention to provide a reliable gasket seal which utilizes an identical seal surface on opposed facing flanges.

It is yet another object of the present invention to provide a gasket seal which utilizes inexpensive, readily available, and easily replaceable gasket material.

Figure 1:
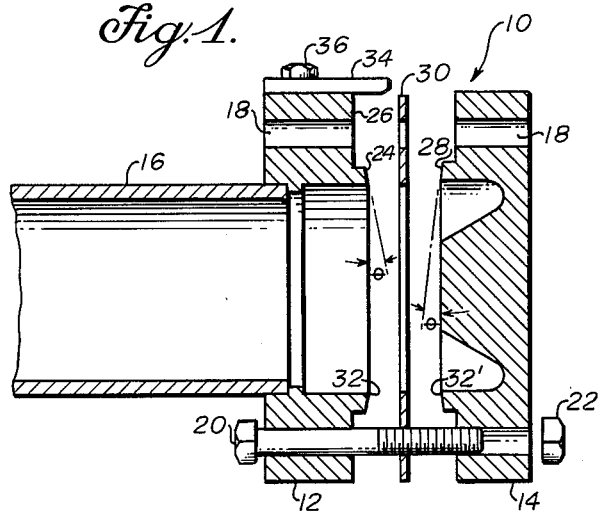
Figure 2:
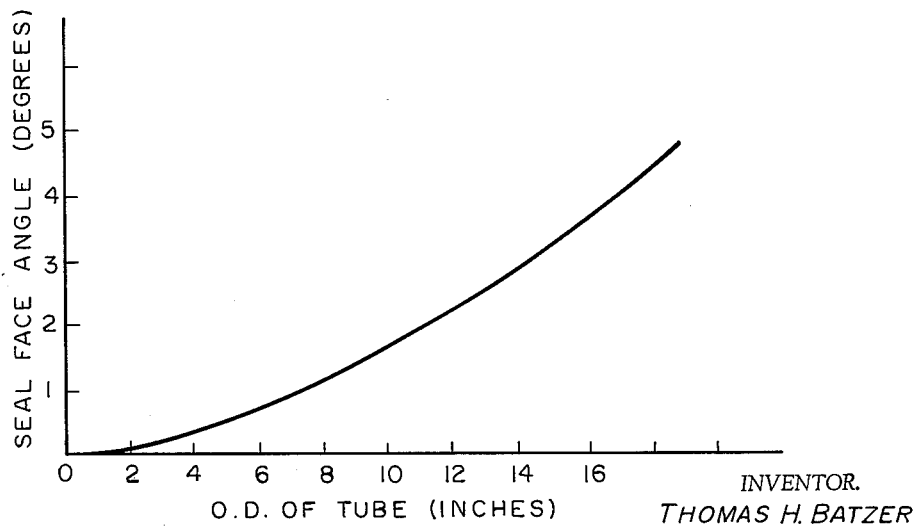

Other objects and advantages will be apparent in the following description and claims considered together with the accompanying drawings, in which:

FIGURE 1 is a cross-sectional view of a gasket seal of the present invention; and FIGURE 2 is a plot of the seal face, or, seal surface angle versus the outside diameter of a tube secured to the gasket flanges.

Referring to FIGURE 1, there is shown a gasket seal 10 comprising a first flange 12 and a second flange 14. In the particular embodiment shown in FIGURE 1, second flange 14 is essentially an end flange which seals off the end of a tube 16. However, flange 14 could be identical in construction to flange 12 and could be used in conjunction with flange 12 to define a seal means between tube 16 and a second tube (not shown). A plurality of holes 18 are drilled in equally spaced relation about the periphery of flanges 12 and 14, and, in conjunction with bolts 20 and nuts 22, provide means for assembling the gasket seal 10. Flange 12 has an annular seal surface 24 machined upon a raised inner portion thereon, wherein the machined surface 24 faces, in general, flange 14 and is particularly machined at an angle, $\theta$, with respect to a plane perpendicular to the axis of the tube 16. The annular seal surface 24 is formed on a step-like portion of the flange 12 and extends axially beyond the surface 26 of the flange. Similarly, flange 14 has a seal surface 28 formed upon a step-like portion of the flange 14 and which faces, in general, flange 12. Seal surface 28 of flange 14 is likewise machined at an angle, $\theta$, with respect to a plane perpendicular to the axis of tube 16. When flanges 12 and 14 are assembled, the seal surfaces 24 and 28 will meet along the innermost circumferences 32, 32' thereof (shown on FIGURE 1 as points, 32, 32') in coextended relation. The ultra-high vacuum seal is provided by an annular strip of aluminum foil 30 which is disposed between the facing seal surfaces of flanges 12 and 14, and which has a radial width of approximately the radial width of the facing flanges.

In particular accordance with the present invention, for optimum sealing results, angle $\theta$ must lie generally within the range of from a few minutes to approximately five degrees. Within this dependably operative range, the precise optimum angle has been found to vary somewhat with the size and use of the particular flange, as is developed in more detail hereinafter. Furthermore, the average width of the seal surfaces 24 and 28 is generally about $\tfrac{1}{16}$ inch, and for smaller flange diameter, approaches a value of 0.10 inch. The aluminum foil gasket 30 may be made of any of many common types of aluminum household foil, the thickness of which ranges generally from 0.0008 to 0.003 inch. For example, in the test flange, an aluminum foil gasket was formed of 1145-0 aluminum foil, 0.0015" thick.

The mechanism whereby an ultra-high vacuum seal is obtained with the simple configuration of the present invention may be further understood by describing the manner of assembling the gasket seal 10. The gasket 30 is made simply by laying a sheet of foil upon one of the flanges 12, 14, and cutting the gasket to the desired shape with say a scalpel. The forming of gasket 30 is facilitated by cutting several "ears" on the foil and taping it to the flange periphery to hold same in place while making the remaining cuts thereabout. Thereafter, the plurality of bolts 20 are placed through the plurality of matching holes 18 in flanges 12 and 14, and the flanges are tightened upon gasket 30 by tightening nuts 22. Proper alignment of the flanges is provided by guide lugs 34 which are fastened to the outer periphery of one of the flanges by tap bolts 36. Since the seal surfaces 24, 28 meet initially along their inner circumferences 32, 32' tightening the nuts results in applying pressure on the outer circumferences of the flanges 12 and 14. Thus, bending moments are provided upon the seal surfaces 24, 28, which tends to force the outer circumferences of the facing flanges 12 and 14 toward one another. Thus, surfaces 24 and 28 tend to "pivot" about circumferences 32, 32' (the leading edge of seal surfaces 24 and 28) to approach (but not necessarily attain) a generally parallel relation therebetween. That is, the value of angle $\theta$ of the seal surfaces is made slightly greater than the angle of flange rotation upon assembly thereof. When properly assembled, the present invention provides a gasket seal of aluminum foil pressed between two surfaces, wherein the inner radial portion of the facing surfaces 24 and 28 generally provides the touching surfaces and the actual sealing sealing effect against the aluminum foil.

In theory, to withstand thermal cycling from 77° K. to 673° K., it is necessary to store energy in the flange joint. This is accomplished by allowing the flanges to rotate due to the moment applied by the bolting force and the gasket reaction. The seal surface is machined at an angle which slightly exceeds the angle of flange rotation at full bolt load. In any flange manifesting the theory of the present invention, the bending moment at any section is $M \times R$, where R is the radius to the centroid of the section (surfaces 24, 28) from the axis of the flange, and M is the moment in inch lbs. per linear inch due to the bolt load and the gasket reaction. The angle of rotation of each section of the particular flange has been given by the relation $$\theta = \frac{MR^2}{EI_0}$$

where E equals the elastic modulus in p.s.i., and $I_0$ equals the moment of inertia of the flange cross section, in terms of "inches taken to the fourth power" with neutral axis perpendicular to the flange axis.

The stress, $S_{max}$, is $$S_{max} \frac{MR}{I_0/c}$$

where $c$ equals half the depth of flange perpendicular to the neutral axis.

The above equations, therefore, are utilized to determine the angle $\theta$ of surfaces 24 and 28 for proper design of the present gasket seal for any given flange size, configuration, and installation. FIGURE 2 shows a plot of the seal surface angle in degrees versus the outside diameter of the tube or member to which the gasket flange is connected (essentially the inner radius of the flanges 12 and 14). The plot is based on the formulas of above mention and indicates, in general, that an increase in surface angle is necessary when utilizing flanges of a larger diameter.

The flange cross-sectional dimensions (moment of inertia) and bolt loading per inch of gasket length are held constant for all dimensions "R" up to 9". For flanges with "R" greater than 9", some yielding will occur; therefore, the moment of inertia must be increased. Therefore, although FIGURE 2 is based upon a constant flange cross-section, a family of curves can readily be derived, based upon various flange cross-sections and the type of material used to construct the flanges.

The recommended bolt loading is 2,000 to 3,000 lbs. per inch of gasket. This may be accomplished by spacing, for example, ⅜" bolts (of 304 stainless steel) at a spacing of about 2". In conventional fashion, the threads may well be lubricated with a high temperature lubricant, and the bolts torqued to approximately 300 lb. inches. The flanges rotate about the circumferences 32, 32′ to increase the width of touching seal surface as the bolt torque is increased.

The provision of applicant's angle $\theta$ to the raised, mating surfaces is crucial to realize a reliable seal. If the angle $\theta$ of the surfaces 24, 28 is machined too small with respect to the other gasket dimensions, gradual pinching of the gasket foil 30 will not be evident when the bolts 20 are tightened. Too large an angle formed therein will tend to cause surfaces 24 and 28 (at circumferences 32, 32′) to cut into the foil 30, preventing a proper seal. Likewise, if the width of the cross section of the facing surfaces 24 and 28 is formed too narrow, the surfaces will tend to cut into and cause an extrusion of the foil 30 disposed therebetween. Too wide a seal surface cross section requires that too great a number of bolts 20 be employed in order to provide the necessary unit stresses upon the foil 30 for proper seal thereof.

While the invention has been disclosed with respect to a single preferred embodiment, it will be apparent to those skilled in the art that numerous variations and modifications may be made within the spirit and scope of the invention. For example, wherein the invention has been described utilizing two flanges having seal surfaces formed at an angle $\theta$, it is to be understood that for particular applications, it may be desirous to utilize a gasket seal wherein only one flange has a seal surface formed at the angle $\theta$; the other flange having a seal surface which lies along a plane perpendicular to the axis of the flange. More particularly, flange 14 could be replaced with a flat plate of suitable material, whereby a seal is effected by disposing the aluminum foil gasket between the one angled seal surface and the facing side of such a flat plate. Thus, it is not intended to limit the invention except as defined in the following claims.

What is claimed is:

1. An ultra-high vacuum gasket seal comprising
   (a) first and second substantially rigid flange members with at least one of said flanges being provided with a central aperture for coupling in a vacuum system, said members having annular seal surfaces formed on raised flange surface portions and disposed in mating coaxial opposed relation contiguous to said aperture, said seal surfaces having a mating width in the range of about 0.010 inch to 0.125 inch, and mating peripheral portions of said flanges outwardly therefrom are spaced whereby the total compressive force between said flanges is borne by said seal surfaces,
   (b) one of said seal surfaces being disposed at an angle with respect to the opposing seal surface such that the inner circumferences thereof make initial line contact therebetween and said seal surface angle defined by the relation $$\theta = \frac{MR^2}{EI_0}$$

where
   $\theta$ = angle of rotation of the seal surface
   $M$ = moment in inch lbs. per linear inch of gasket
   $R$ = radius to the centroid of the section from the axis of the flange
   $E$ = elastic modulus in p.s.i.
   $I_0$ = moment of inertia of the flange cross section in inches to the fourth power,
   (c) an aluminum foil gasket disposed between said seal surfaces, said gasket having a thickness in the range approximately from 0.0008 inch to 0.003 inch, and
   (d) coupling means applying a force between said flanges outward from the initial line of contact of said seal surfaces to provide a bending moment $M$ effective to progressively deflect said surfaces into contact across said foil gasket but of a magnitude below that required to yield an angular deflection equivalent $\theta$.

2. The combination according to claim 1 wherein each of said annular seal surfaces is disposed at an angle to a plane perpendicular to the axis of said seal surfaces equivalent to said angle $\theta$.

3. A gasket seal for providing an ultra-high vacuum seal between two adjacent vacuum system members comprising,
   (a) a first rigid metal flange secured to one of said members,
   (b) a second rigid metal flange secured to the second of said members and faced in opposed coaxial relation to said first flange, at least one of said flanges being centrally apertured for connection in said vacuum system,
   (c) said first and second flanges having annular raised seal surfaces formed thereon wherein said seal surfaces have a mating width in the range of 0.010 inch to 0.125 inch and are disposed in opposed mating coaxial relation to each other with mating peripheral flange portions outwardly therefrom being spaced whereby the total compressive force between said flanges is supported by said seal surfaces, said seal surface of said first flange being at an angle $\theta$ with respect to a plane perpendicular to the axis of said flange, said seal surface angle defined by the relation $$\theta = \frac{MR^2}{EI_0}$$

where
   $\theta$ = angle of rotation of the seal surface
   $M$ = moment in inch lbs. per linear inch of gasket
   $R$ = radius to the centroid of the section from the axis of the flange
   $E$ = elastic modulus in p.s.i.
   $I_0$ = moment of inertia of the flange cross section in inches to the fourth power,
   (d) an annular aluminum foil gasket disposed between said facing seal surfaces, said gasket having a thickness in the range of approximately 0.0008 inch to 0.003 inch, and (e) bolt means disposed to force the outer periphery of said flanges towards one another and clamp said gasket between said seal surfaces by developing a bending moment M of a magnitude approaching that required to produce a deflection of said angular seal surface approaching $\theta$.

4. The combination according to claim 3 wherein the seal surface of said second flange is also formed at said angle $\theta$ with respect to a plane perpendicular to the axis of the flange.

References Cited by the Examiner

UNITED STATES PATENTS

| | | | |
|---|---|---|---|
| 1,715,854 | 6/29 | McKenzie-Martyn. | |
| 1,834,581 | 12/31 | Ferrell | 285—368 |
| 2,412,487 | 12/46 | Amley | 285—423 |
| 2,922,666 | 1/60 | Lange | 285—363 |
| 2,940,779 | 6/60 | Del Buono | 285—363 |
| 2,944,842 | 7/60 | Stiff | 285—368 |
| 2,984,899 | 5/61 | Richter | 285—410 |
| 3,135,538 | 6/64 | George | 285—363 |

CARL W. TOMLIN, *Primary Examiner.*